Figure 1:
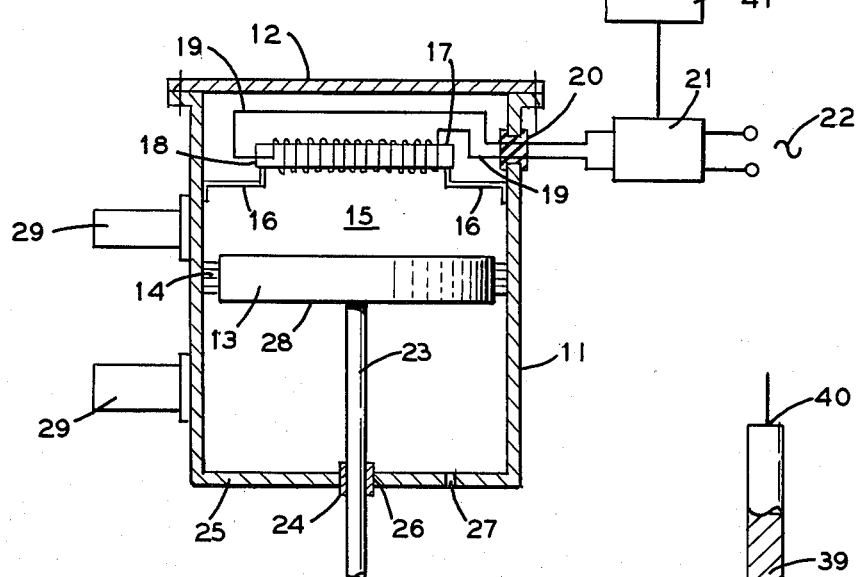

United States Patent [19]

Golben

[11] 4,385,494

[45] May 31, 1983

[54] FAST-ACTING SELF-RESETTING HYDRIDE ACTUATOR

[75] Inventor: Peter M. Golben, Wyckoff, N.J.

[73] Assignee: MPD Technology Corporation, Wyckoff, N.J.

[21] Appl. No.: 273,852

[22] Filed: Jun. 15, 1981

[51] Int. Cl.³ ............................................. F03G 7/00
[52] U.S. Cl. ....................................... 60/528; 60/673; 60/513
[58] Field of Search .................. 60/649, 673, 516, 531, 60/513, 528

[56] References Cited

U.S. PATENT DOCUMENTS

| | | | |
|---|---|---|---|
| 3,041,821 | 7/1962 | Lindberg, Jr. .......................... | 60/527 |
| 3,504,494 | 4/1970 | Winsche ............................ | 60/649 X |
| 3,823,560 | 7/1974 | Hansen ............................... | 60/531 X |
| 4,085,590 | 4/1978 | Powell et al. ....................... | 60/649 X |
| 4,090,361 | 5/1978 | Terry et al. ............................ | 60/649 |

Primary Examiner—Allen M. Ostrager
Attorney, Agent, or Firm—Francis J. Mulligan, Jr.; Raymond J. Kenny

[57] ABSTRACT

A fast-acting, self-resetting hydride actuator comprising an enclosure containing hydrogen, and an actuating means communicating with the interior of the enclosure responsive to changes in pressure of the hydrogen gas and adapted to provide an actuating force based upon a change in pressure of the hydrogen gas. The actuator also comprises an electric resistance means inside the enclosure which includes a resistor element made in whole or in part of a hydridable electric conductor and means for passing electric current through said resistor element.

11 Claims, 3 Drawing Figures

FAST-ACTING SELF-RESETTING HYDRIDE ACTUATOR

The present invention is concerned with actuating means, and in particular a fast-acting, self-resetting actuator including a hydridable material.

PRIOR ART AND PROBLEM

All self-resetting actuators known to be on the market have one or more of the following problems.

1. They cannot develop a very large actuating force without drawing an extremely large amount of power; or
2. They are vulnerable to failure due to vibration, shock and harsh environmental conditions, such as water, chemicals and extreme temperature cycling; or
3. They are fairly slow acting, i.e. they take about one minute or more to develop actuating force.

Prior to this disclosure, I had proposed to provide a solution to the problem of providing an adequate self-resetting actuator by using a metal hydride that when heated will release its hydrogen and create pressures that will be able to perform useful work. This proposal is set forth in U.S. patent application Ser. No. 114,522 filed in my name on Jan. 23, 1980. The drawback to this solution is that the proposed method for heating up the hydride has involved independant resistors or heat pipes, which not only require large amounts of energy to overcome the thermal mass but the heat that is generated by them must first pass through the heating element itself before it can start heating up the hydride. This process creates a substantial time lag from the start of actuation, that is, when current is turned on to the completion of actuation. A time lag of about 30 seconds minimum normal with this type of actuator.

DISCOVERY

It has now been discovered and it is the object of the present invention to provide an actuator which overcomes the time lag problem inherent in my previous proposal.

GENERAL DESCRIPTION OF THE INVENTION

The present invention is a modification of my previously disclosed metal hydride actuator which modification involves the heating of metal hydride by passing electric current through the metal hydride itself. In toto, the self-resetting actuator of the present invention comprises (a) an enclosing means containing hydrogen gas, (b) means communicating with the interior of said enclosing means responsive to changes in pressure of said hydrogen gas and adopted to provide an actuating force, (c) electric resistance means in said enclosing means including a resistor element made of a hydridable electric conductor and (d) means for passing electric current through said enclosing means and said resistor element.

With hydrides such as hydrides of palladium or a palladium alloy such as a palladium-silver alloy containing about 1% to about 25% by weight of silver, which tend not to break apart even after being hydrided numerous times (non-decrepitating hydrides), the essential feature of the actuator of the present invention can be a resistor element such as a wire-wound resistor on an insulating support. The wire can be of palladium-rich alloy or any other metal which can be produced in wire form and which forms a hydride. Those skilled in the art will appreciate that the resistor element need not necessarily be a wire element but can be any form or film or massive element such as employed in the electric heating art.

The resistor element can take other forms. For example, hydridable materials of a wide variety including intermetallic compounds of the $AB_5$ type can be incorporated into metallic bonded bodies which are resistant to decrepitation in hydride/dehydride cycles. For example, the compound $LaNi_5$ can be sintered together with nickel powder to form a solid pellet-like material which will retain its shape during hydriding/dehydriding provided sufficient nickel is copresent. Satisfactory amounts of free nickel can be in the range of 50–75% nickel based upon the total nickel plus $LaNi_5$ in the composition. Such a sintered body in granulated form can be packed into a porous, ceramic tube and fitted with electrical contacts on both ends. The thus produced tube can act as a hydride resistor element. Nickel-bonded $LaNi_5$ containing about 75% to 90% by weight free nickel can also be sintered or sintered and drawn into wire form and used alone or as a sintered coating on a nickel wire as a resistive element in accordance with the present invention. In like manner, a porous, sintered, inert powder coat can be formed on a titanium or palladium wire. The composite wire capable of hydrogen absorption can then be wound on a ceramic spool to provide the resistive element characteristic of the present invention.

DESCRIPTION OF THE DRAWING AND PREFERRED EMBODIMENT

Figure 3:
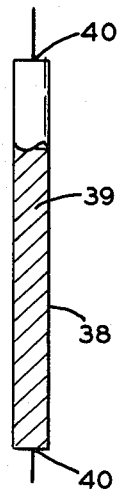
Figure 2:
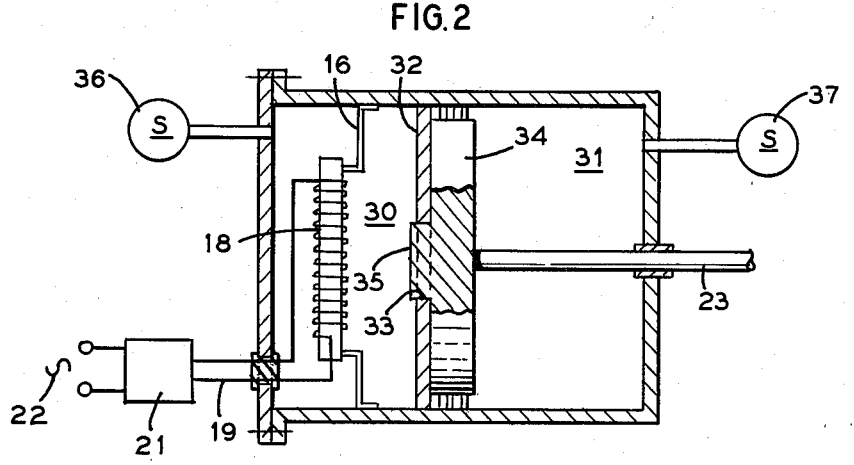

The present invention is illustrated by the drawing in which FIG. 1 shows schematically, in section, the enclosure containing hydrogen and including the actuating means and resistor element of the present invention:

FIG. 2 depicts an alternate version of the actuator of the present invention: and FIG. 3 shows a resistor element useful in accordance with the present invention.

Referring now to FIG. 1, this figure of the drawing depicts cylinder 11 closed by plate 12 at one end and fitted with piston 13. Together the wall of cylinder 11, plate 12, piston 13 and piston sealing rings 14 define a chamber means or enclosing means 15 in which hydrogen gas is contained. Within chamber means 15 is mounted, by mounting units 16 cylindrical ceramic support 17 upon which is wrapped palladium wire 18. Palladium wire 18 is of such a gage, for example about 28 to about 35 AWG (0.03211 cm to 0.01426 cm) and length to provide a reasonable ohmic resistance and hydrogen capacity. Electrically conductive leads 19 are joined to each end of hydridable metal, e.g., palladium, wire 18 and pass through the wall of cylinder 11 by means of hermetic, insulative leadthrough 20. Leads 19 connect wire 18 to control switch 21 and ultimately to current source 22 which can be an A.C. or D.C. source. Control switch 21 can be any means, responsive to any stimulus, whereby electric current of appropriate voltage can be passed through wire 18. Piston 13 has attached thereto piston rod 23 which passes through opening 24 in bottom plate 25 preferably in loose contact with slide bearing 26. Bottom plate 25 also contains port 27 which permits free passage of air or other ambient gas so as to equalize pressure between the ambient and outer face 28 of piston 13. The actuator as depicted in the drawing can be mounted in any location by fixtures 29 or by any other convenient means. Piston rod 23 is connected, at its distal end (not illustrated) to means requiring pressurized actuation.

In the usual operation of the actuator of the present invention as depicted in FIG. 1 of the drawing, hydrogen gas is absorbed into hydridable metal wire 18 at low temperatures. When actuation is signaled to control switch 21, electric current from current source 22 is caused to pass through wire 18 which immediately increases in temperature according to the $I^2R$ law. The increase in temperature of palladium wire 18 causes two effects. The major effect is a rapid release of absorbed hydrogen gas and the minor effect is a heating of gas in chamber 15 by an amount of thermal energy equal to the difference between electrical energy input proportional to $I^2RT$ and that thermal energy required to desorb the hydrogen gas. Both effects produce an increase in pressure in chamber 15 and cause piston 13 and piston rod 23 to travel outwardly (downwardly as illustrated) and actuate whatever means is connected to piston rod 23. The force exerted by piston rod 23 can be considerable. For example, for a chamber volume of 1.632 cc, a mass of 0.308 grams of palladium, an initial hydrogen pressure of 0.0082 atmosphere absolute, a piston with a cross-sectional area of 3.871 cm$^2$ and a $\Delta T$ of the palladium-palladium hydride resistor of about 246° in celsius units, a force of about 13.2 kg/cm$^2$ operating over a distance of 0.422 cm with as little input as 53.6 Joules of energy can be achieved. Assuming a volatage of 24 VDC is used, with a current of 2 amps, then actuation can occur in as little as about $1\frac{1}{8}$ seconds. When in response to a stimulus, control switch 21 cuts off current to palladium wire 18, palladium wire 18 cools rapidly, hydrogen gas is reabsorbed and the system of the actuator as depicted in FIG. 1 returns to its initial condition. If very rapid cycling is required, means can be provided for cooling the exterior of the actuator of FIG. 1 when control switch 21 cuts off flow of electric current to resistor 18.

An alternate, albeit more complex, form of an actuator of the present invention is depicted in FIG. 2. Referring now thereto, palladium wire 18 is mounted in a first chamber 30 which is separated from a second chamber 31 by wall 32 having a port 33. In second chamber 31 is mounted movable piston 34 having a boss 35 on the surface facing the first chamber. Boss 35 fits port 33 to provide a first, low-surface-area piston. First chamber 30 is pressurized from pressure source 36 and second chamber is pressurized from source 37, at least source 36 being hydrogen, to provide on piston 34 a balance of forces such that $P_{31} \cdot A$ is equal to or only slightly larger than $P_{30} \cdot A$. Upon passage of electric current from source 22 through control switch 21 palladium wire heats and, when sufficiently hot, causes desorption of hydrogen and an increase in pressure in chamber 31. This in turn causes a slight movement of piston 34 to the right and sudden exposure of the entire exposed surface area of piston 34 to high pressure 36. The resultant imbalance substantially instantaneously causes rapid movement of piston 34 and piston rod 23 to the right. Cut-off of electric current to palladium wire 18 and cooling thereof with or without venting and subsequent repressurization of chamber 31 allows reabsorption of hydrogen and permits reestablishment of the initial balanced condition.

As mentioned hereinbefore, the electroconductive hydride resistance element can comprise a decrepitating hydridable material in physical and mechanical association with a metal which metal and hydride, together, constitute the electric resistance element. For purposes of this specification and claims, a "nondecrepitating hydridable metal" is one which retains its physical form during and after a plurality of hydriding/dehydriding cycles. On the other hand, a "decrepitating hydridable metal" is one which spontaneously breaks down, usually to a fine powder during hydriding/dehydriding cycling. One embodiment of such an electric resistance element which can be employed in place of palladium wire, foil, etc. or any other nondecrepitating hydridable metal is depicted in FIG. 3 of the drawing. Therein is shown in cross-section porous ceramic tube 38 which contains packaged granules 39 of decrepitating hydridable metal sintered along with other metal and has electrical contact means 40 positioned on each end. The decrepitating hydridable metal used in granules 39 can be any one or more of LaNi$_5$, Mischmetal (M)Ni$_5$, FeTi, (Fe$_{0.8}$Ni$_{0.2}$)Ti, CaNi$_5$, Mg$_2$Ni, Mg$_2$Cu or any other metallic hydridable material. The non-hydridable metal in sintered granules 39 is advantageously nickel but other metals having a significant electrical resistivity and relatively high melting point such as nickel-copper alloy, iron, nickel-chromium alloy, etc. also be used. The metal to be sintered (or more broadly—metallurgically bonded) into a resistor along with hydridable metal should be essentially non-reactive with the hydridable metal. In this regard, care should be taken in the use of aluminum as the whole or a part of the non-hydridable metal because aluminum has the capability of reacting with at least some ANi$_5$ compounds at elevated temperatures to form non-hydridable intermetallic compounds such as NiAl, NiAl$_3$, etc.

As an auxiliary feature of the actuator of the present invention one can include a status indicator depicted in FIG. 1 schematically as means 41. Means 41 comprises in combination a means for sensing the resistance of wire 18 and an indicating means responsive the resistance of wire 18. Although, as depicted in FIG. 1, means 41 is associated with control switch 21, means 41 can be positioned elsewhere and can be connected directly or indirectly to wire 18. Means 41 operates on the principle that the electrical resistivity of a metal hydride is different from that of the unhydrided metal. In the case of palladium, the resistivity of palladium hydride at 20° C. is about twice the resistivity of the pure metal. Accordingly variations in a small sensing current sent by or on behalf of means 41 through wire 18 will indicate the relative of degree of hydriding of wire 18 and thus the status of the actuator. In the case of hydridable materials other than palladium, a different variation in resistivity may occur. Specifically in the case of vanadium, the resistivity of this material decreases as the quantity of hydrogen combined as vanadium hydride increase. Those skilled in the art will thus appreciate that sensing means 41 must be specifically adapted for use with the specific hydride resistor being employed and that various individual hydridable materials and combinations thereof as resistors can be usefully employed in given situations.

With specific reference to actuators of the present invention employing palladium, palladium alloy or like hydridable metal as resistance wire 18, it is quite likely that the especially rapid response of the actuator is due, in part, to the decrease in resistance as hydrogen is desorbed from the wire. This decrease in resistance will cause greater heating by the Joule Effect which, in turn, increases the rate of release of the hydrogen from the wire.

Actuators of the present invention are particularly useful where ruggedness and reliability under extreme conditions are required. One example of a specific area of utility of the actuators of the present invention is in automatic actuation of fire protection systems on off-highway vehicles such as construction and mining machines. For these systems an actuator is required to withstand constant vibration and harsh environment and yet actuate quickly upon command and then reset itself. Another application is for fire protection in airplane engine compartments where rapid detection is essential and where resettability is important in case of multiple fires.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

The embodiments of the invention in which an exclusive property or privilege is claimed are defined as follows:

1. A self-resetting actuator comprising
   A. an enclosing means containing hydrogen,
   B. means responsive to changes in pressure of said hydrogen gas and adapted to provide an actuating force
   C. electric resistance means in said enclosing means including a resistive element made of a hydridable electric conductor, and
   D. means for passing electric current through said resistive element upon command.

2. An actuator as in claim 1 wherein said means responsive to changes in pressure of said hydrogen gas is a movable piston.

3. An actuator as in claim 1 wherein said electric resistive element comprises essentially a nondecrepitating hydridable metal.

4. An actuator as in claim 3 wherein said nondecrepitating hydridable metal is essentially palladium.

5. An actuator as in claim 1 wherein said electric resistive element comprises a physical and mechanical association of a decrepitating hydridable metal and a nonhydridable metal both of said metals together carrying electric current passed therethrough.

6. An actuator as in claim 5 wherein said decrepitating hydridable metal and said nonhydridable metal are associated together in a metallurgically bonded structure.

7. An actuator as in claim 1 including a means for sensing and indicating the electrical resistance said resistive element.

8. An actuator as in claim 4 wherein the hydridable metal is an alloy of palladium and silver containing about 1 to about 25 percent by weight of silver.

9. A self-setting actuator comprising
   A. an enclsoing means containing hydrogen gas;
   B. means responsive to changes in pressure of said hydrogen gas and adapted to provide an actuating force;
   C. electric resistance means in said enclosing means including a resistive element made of a hydridable electric conductor said hydridable electric conductor being characterized by a low resistivity when not hydrided and a higher resistivity when hydrided, and
   D. means for passing electric current through said resistive element upon command.

10. An actuator as in claim 9 wherein said means responsive to changes in pressure of said hydrogen gas is a movable piston.

11. An actuator as in claim 9 wherein said electric resistive element comprises essentially a nondecrepitating hydridable metal.

* * * * *